April 11, 1967 W. T. HARVEY, JR 3,313,630
PROCESS AND APPARATUS FOR PRESERVING ANIMAL AND PLANT MATTER
Filed Aug. 28, 1964
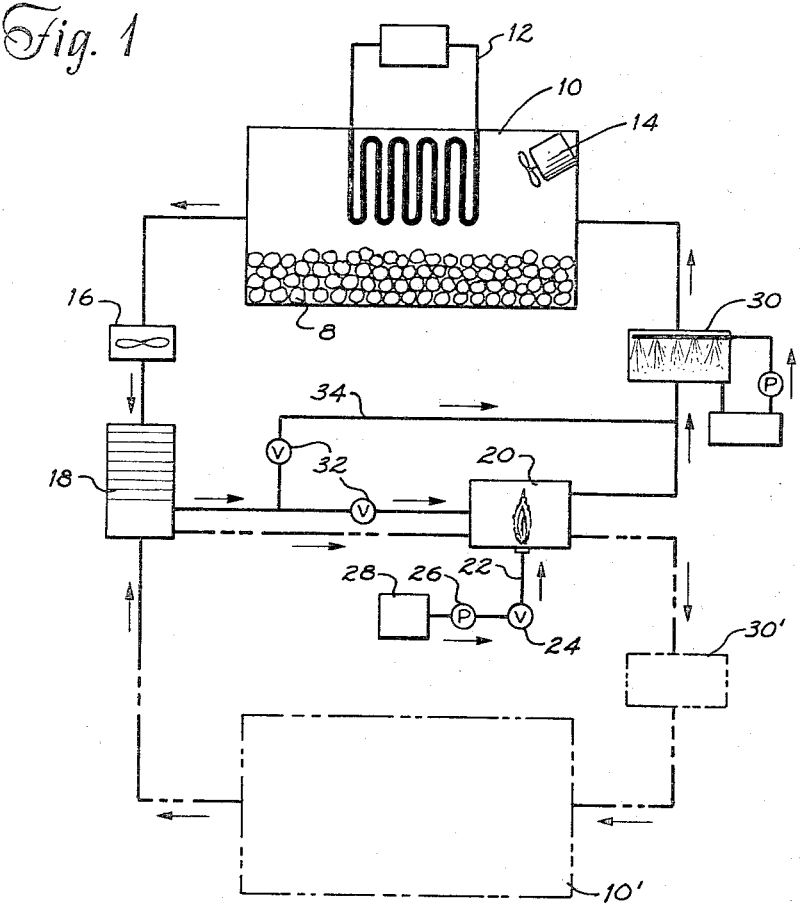
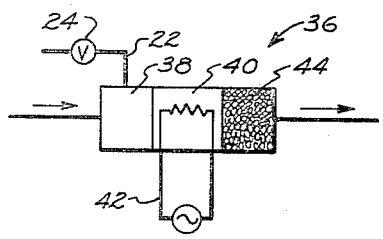
INVENTOR
WILLIAM T. HARVEY JR.
BY Laurence R. Hefter
ATTORNEY

United States Patent Office 3,313,630
Patented Apr. 11, 1967

3,313,630
PROCESS AND APPARATUS FOR PRESERVING
ANIMAL AND PLANT MATTER
William T. Harvey, Jr., Alexandria, Va., assignor to Atlantic Research Corporation, Fairfax County, Va., a corporation of Virginia
Filed Aug. 28, 1964, Ser. No. 392,716
8 Claims. (Cl. 99—150)

This invention relates to a process and apparatus for preserving animal and plant matter by means of retarding the rate of respiration of said matter.

The solution to the problem of storing perishable or oxidizable animal or plant matter for extended periods of time with limited physiological and micro-biological deterioration has long been unsatisfied. It is well known that both animal and plant matter, after being separated from their parent source, will continue their respiratory activities whereby oxygen is assimilated from the surrounding atmosphere and carbon dioxide and water vapor are emanated. It is also well known that both the reduction in available oxygen in the surrounding atmosphere and the flooding of the surrounding atmosphere with excessive carbon dioxide will retard or possibly terminate the respiratory activities of the stored matter. This would lead one to believe that by reducing the oxygen content or increasing the carbon dioxide content the storage problem is solved, and, in fact, many prior art devices have incorporated this principle in their operation.

One type of prior art storage means merely involves sealing off a storage chamber and relying upon the inherein respiratory activity of the stored matter to reduce the oxygen content and increase the carbon dioxide content within the chamber. After a period of time, a quiescent or equilibrium state is attained whereby the carbon dioxide content is sufficiently high and the oxygen content sufficiently low to cause the respiratory activities to cease or, at least, slow down to a desirable rate. The major problem involved with this process is that the length of time required until equilibrium is reached, in most cases, is unacceptable and, furthermore, the deterioration of the matter stored within the chamber will have advanced to an undesirable state. Furthermore, sealing the storage chamber is very expensive and the stored matter remains inaccessible until it is desired to remove the matter because entering the storage chamber will admit fresh air and, thus, accelerate the respiration.

Another attempted solution has been to remove the air contained within the storage chamber and replace it with an inert gas such as nitrogen. This procedure, however, is quite expensive and also renders the storage chamber inaccessible during the storage period. Additionally, it is exceedingly difficult to satisfactorily remove the air within the chamber since the air is present in the innermost regions of the matter itself and, as such, resists the infiltration of inert gas therein.

More recent solutions include introducing a predetermined desired atmosphere into the storage chamber such as by burning a carbonaceous fuel in the presence of air to reduce the oxygen content and increase the carbon dioxide content of the air. The combustion products are then ducted directly into the storage chamber. Since it is undesirable to permit the atmosphere to remain stagnant within the storage chamber, a vent is usually provided for some dissipation of the storage atmosphere, the dissipated gases being replaced with fresh products of combustion. This open-circuit process however, requires that a combustion means be continually present to burn fresh air constantly or intermittently in order to provide the desired atmosphere. Furthermore, and of greater importance, the open-circuit system requires a considerable time period in order to provide the desired storage atmosphere, or in the alternative, it requires high capacity equipment. The former alternative is unacceptable for the reasons cited above and the latter alternative is quite expensive since the high capacity is not needed to maintain the atmosphere but only to originally provide it.

More recent studies have indicated, however, that the presence of a high concentration of carbon dioxide is undesirable, for example, because it induces changes in the structure of the stored matter into a fibrous state. While still remaining usable this often results in an undesirable product since the texture or taste of the stored matter will vary from that of the natural state. Furthermore, it has been learned that by the elimination of carbon dioxide from the storage chamber the shelf life of the stored matter has increased considerably. Additionally, complete elimination of oxygen from the storage chamber will terminate the respiratory process and such termination is undesirable if "freshness' is to be retained. Therefore, it is apparent that the the most desirable storage atmosphere contains a quantity of oxygen less than that normally found in air, for example, equal to or less than 5%, and other inert gases normally found in air, and that it be essentially free of carbon dioxide and other products of respiration such as ethylene, aldehydes and ketones. This has led to a new class of apparatus for preserving animal and plant matter which includes filtering or purifying the atmosphere to remove carbon dioxide and other respiration products and cycling the purified atmosphere back into the storage chamber. To augment the oxygen removal, rather than rely upon the respiration of the stored matter to utilize the available oxygen, a combustion means or burner is usually included between the storage chamber and the purifying means such that the atmosphere removed from the storage chamber passes through the burner wherein the oxygen is converted into carbon dioxide and water vapor. The gaseous products then flow through the purifying means where the carbon dioxide, water vapor, and other respiration products are removed. The purified gas is then readmitted to the storage chamber. Because of the high temperature of the gas leaving the burner, it has been found necessary to provide a refrigeration source between the burner and the purifying means. The inclusion of this additional refrigeration apparatus increases the cost of the equipment and the operation of the process as well as providing an additional source of possible apparatus failure and process breakdown.

Accordingly, it is one object of the present invention to provide a process and apparatus for retarding the respiration rate of plant and animal matter which rapidly, efficiently, and relatively inexpensively, generates the desired storage atmosphere.

Another object of the present invention is to provide a process and apparatus for retarding the respiration rate of plant and animal matter which permits complete and continued accessibility of the storage chamber without detrimentally affecting the stored matter.

A still further object of the present invention is to provide a process and apparatus for retarding the respiration rate of plant and animal matter which rapidly and inexpensively provides an atmosphere including the desirable small quantity of oxygen and which is void of harmful respiration products.

Further objects and attendant advantages of the present invention will become better understood from the following description.

Briefly stated, this invention in one form provides a process and apparatus for carrying out the process for preserving animal and plant matter by retarding the respiration rate of such matter contained within a storage chamber. The retardation is effected by controlling the content of oxygen and respiration products in the atmosphere in which the matter is stored. This control is effected by continuously circulating the storage atmosphere through a closed circuit which includes, sequentially, a storage chamber, gas-purifying means, combustion means, and a humidifier. A refrigeration unit is conventionally included within the storage chamber in order to maintain the temperature within the chamber at a constant value, the temperature depending upon the matter stored. The storage atmosphere initially is normal atmospheric air comprising approximately 79% nitrogen, 21% oxygen, .04% carbon dioxide, water vapor, and traces of inert gases.

In order to produce the desired storage atmosphere, the initial storage atmosphere is first passed through an adsorption unit wherein the carbon dioxide, water vapor, and other respiration products are removed thus producing a purified gas consisting primarily of nitrogen, oxygen, and inert gases. The purified gas is then admitted to a combustion means wherein an oxygen-combustible fuel is burned in the presence of the purified gas to convert a portion of the oxygen into carbon dioxide and water vapor. The fuel-to-oxygen ratio is such that there will be substantially complete combustion of the fuel with a remaining excess of oxygen. The high temperature gaseous mixture which includes nitrogen, carbon dioxide, water vapor, inert gases and oxygen, the oxygen content being less than that normally found in air, is then circulated through a humidifier to increase the relative humidity of the gaseous products to within the range of 85–100% and then the humidified gaseous mixture is introduced back into the storage chamber. Because the volume of the high temperature gaseous mixture entering the storage chamber over a short time interval is small compared to the volume of the storage atmosphere within the chamber, the over-all effect on the temperature of the storage atmosphere is small and can be handled by the refrigeration means of the storage chamber. Therefore, there is no need for additional refrigeration equipment. The introduction of carbon dioxide into the storage chamber is not harmful because the storage atmosphere is continuously circulated and the carbon dioxide is removed rapidly thus having a relatively short storage chamber residence time. This circulation is continued until the oxygen content in the storage atmosphere is equal to a predetermined value at which time the purified gas leaving the adsorption unit is diverted around the combustion means and fed directly to the humidifier. The predetermined value of oxygen at which point the diversion occurs is dependent upon the matter stored.

The invention will be better understood from the following description taken in combination with the accompanying drawing in which:

FIGURE 1 is a diagrammatic illustration and flow sheet of the apparatus and process formed in accordance with the present invention.

FIGURE 2 is a schematic illustration of a catalytic burner employed in the preferred form of the present invention.

While it is to be understood that the apparatus and process which is the subject matter of this invention may be employed for preserving many species of animal and plant matter, the following detailed description will relate to the preservation of a particular plant matter. This permits greater detail in discussion and facilitates clearly describing the subject matter since it permits allusion to specific parameters and examples and should not be considered as limiting the scope of this invention.

Referring now more particularly to FIGURE 1 of the accompanying drawings, the produce 8 to be stored, for example apples, it contained within a storage chamber 10 having suitable access passages (not shown) for loading, unloading, and inspecting the stored matter. The storage chamber 10 is refrigerated by any suitable conventional refrigeration means 12 in order to keep the atmospheric temperature in the chamber within the desired temperature range. This range is dependent upon the particular matter stored, for example, the range for storing apples is approximately 29–40° F. A circulating means or fan 14 is provided within the storage chamber 10 to circulate the storage atmosphere, thus facilitating refrigeration of the atmosphere and preventing stagnation of the layer of atmosphere immediately adjacent the stored products.

The storage atmosphere initially consists of normal atmospheric air comprising approximately 79% nitrogen, 21% oxygen, .04% carbon dioxide, traces of inert gases, and water vapor, the quantity of water vapor varying depending upon the relative humidity of the air. It has been found that for maximum storage life and for the optimum quality of stored apples, the storage atmosphere oxygen content should be reduced to 3–5% within a relatively short period of time, for example, within 2–3 weeks. Several states designate an apple storage system which achieves this reduction in oxygen content in the stated time as "controlled atmosphere storage" which commands a premium in the market place. In order to attain the desired atmosphere within the optimum time period, the storage atmosphere is continuously circulated through the closed circuit described below which efficiently decreases the oxygen content, and removes the harmful respiration products. In practice, the below-described system provides the desired atmosphere in a considerably shorter time, for example, one week or less.

A portion of the atmosphere is continuously removed from the storage chamber 10 by any conventional pumping means 16. The pumping means may take the form of an exhaust fan, a pump or any other gas-moving apparatus. The storage atmosphere is admitted to a purification means 18 for the removal of carbon dioxide, ethylene, and other respiration products or impurities. While it is not necessarily desirable to remove water vapor during the purification process, as a practicable matter this usually results, thus producing a relatively dry purified gas comprising nitrogen, oxygen, and inert gases. While any type of gas-purifying means can be employed, the preferred form of purification means 18 is a rechargeable, continuously operating adsorption means. The particular adsorbent utilized depends upon the stored matter and the particular gases required to be removed. For example, when the stored matter is apples and it is necessary to remove carbon dioxide, ethylene, aldehydes, and ketones, a suitable adsorbent is synthetic zeolite which is rechargeable by the application of heat. Another usable, albeit less efficient, purification means is a conventional absorptive device such as a water scrubber.

Since the purified atmosphere leaving the purification means or adsorption unit 18 still includes a relatively large percentage of oxygen, the purified atmosphere is then directed to an oxidation or burning means 20 for the conversion of oxygen into carbon dioxide and water vapor. The combustion means employs an oxygen-combustible fuel for converting the oxygen into another form easily removed by the purification means 18. Fuels such as hydrogen, alkanes of up to five carbon atoms, and mixtures thereof can be employed. Propane is the preferred fuel since it is inexpensive and most easily handled, however, other mixtures such as natural gas, water gas, and liquified petroleum gas (LPG) have been found to be suitable. Because it is desirable to maintain some oxygen in the resultant storage atmosphere the propane is admitted in a less-than-stoichiometric quantity through a fuel feeding circuit including a conduit 22, a fuel control valve 24, a pump 26, and a reservoir 28. This will ensure substantially complete combustion of the fuel in the presence of the purified atmosphere without removing the entire quantity of oxygen. When a hydrocarbon fuel is used, resultant gaseous mixture includes nitrogen, carbon dioxide, water vapor, and oxygen. While the eventual goal is to provide a storage atmosphere having an oxygen content of predetermined value, for example, 3–5%, it is not necessary that this content be reached immediately, that is, during the first cycle of the storage atmosphere. Accordingly, it is not necessary that the gaseous mixture leaving the burner 20 contains oxygen having the predetermined final desired amount. The gases initially leaving the burner 20 may include oxygen having a higher than desired quantity, however, after several passes through the circuit, the oxygen content will be lowered to the desired level.

In order to avoid continual variation of fuel flow, which would require either continual manual control or expensive automatic fuel flow control means, it has been found desirable to initially set the fuel flow at a level adequate to burn a fixed quantity of the oxygen available in each flow pass through the burner. For example, the fuel flow can be calculated to burn oxygen equal to 2 to 3% by volume of the flow stream thus requiring the same quantity of fuel whether the oxygen content of the storage atmosphere is 21%, 10%, 6%, etc. The process can run control-free until the desired oxygen content is obtained at which time the burning step of the process is terminated as described below.

A preferred form of burner 20 is a catalytic burner 36, an example of which is schematically illustrated in FIGURE 2. The catalytic burner 36 includes a mixing zone 38 where the incoming purified atmosphere is mixed with the fuel. The fuel-atmosphere mixture is preheated in the heating zone 40 by an electrical resistance heater 42 and burning takes place in the catalyst chamber 44. Platinum-coated pellets have been found to be very effective as the catalyst.

The primary advantage of using a catalytic burner 36, as contrasted with a conventional flame burner, is that flame conversion requires a fairly high initial oxygen concentration, i.e., at least about 14%. Since it is desirable to bring the oxygen content down to about 5% or less, conventional flame conversion would be required to drop the oxygen concentration in the atmosphere from 14% or more down to the desired level in one pass. This would require a higher capacity burner thus increasing the cost of equipment. Catalytic burners, however, effectively chemically combine oxygen and the oxidizable portion of the fuel even at very low oxygen concentration levels. This permits recirculation of the storage atmosphere many times through the burner and permits gradual reduction in the oxygen concentration thus providing the net result of a high capacity, once through, system by the use of a much smaller, less expensive burner. Another advantage of catalytic burners is the low temperature of the combustion products as compared with that of a flame burner. By keeping the temperature of the combustion products relatively low, the refrigeration system in the storage chamber is not overloaded.

The gaseous mixture leaving the burner 20 is admitted back into the storage chamber 10 in order to constitute the storage atmosphere and be refrigerated. The temperature of the gaseous mixture is relatively high, even if a catalytic burner is used, albeit it is lower than if a flame burner is employed. Because the adsorbent employed in the purification unit 18 regenerates rather than adsorbs at high temperatures, the combustion products cannot be fed directly to the purification unit 18. Since the storage chamber needs refrigeration means to provide the desired storage atmospheric temperature, the gaseous mixture is fed through the storage chamber prior to entering the purification means 18.

Another parameter for proper storage atmosphere is high relative humidity, in the order of 85–100%. Because the purification unit 18 removes water vapor as part of its purification process, it is necessary to humidify the combustion products. The humidification may be done by any conventional humidifying unit 30 prior to admission into the storage chamber or the humidification may be done inside the storage chamber during the refrigeration process.

It may now be seen that the closed circuit process of this invention for retarding the respiration of stored animal and plant matter comprises removing the storage atmosphere from the storage chamber 10 in which the matter is stored, subjecting the storage atmosphere to a purification process during which carbon dioxide and other respiration products are removed, burning a less-than-stoichiometric quantity of oxygen-combustible fuel in the presence of the purified atmosphere leaving the purifying means in order to convert a portion of the oxygen remaining in the purified atmosphere into carbon dioxide and water vapor, humidifying the combustion products and readmitting the humidified combustion products back into the storage chamber where they are refrigerated. Continuation of the cycle brings the carbon dioxide and oxygen content down into the desired range within a reasonably short period of time. The time required is controlled by the capacity of the purification unit and by the quantity of fuel burned in the presence of the purified atmosphere.

As mentioned above, it is mandatory that not all the oxygen be removed from the storage atmosphere. Therefore, after the oxygen has been reduced to the desired range it is necessary to by-pass the purified atmosphere leaving the purification means 18 around the burner 20 such that it flows directly to the humidifier 30 or the storage chamber 10. Conventional valving means 32 and conduit means 34 are provided to accomplish the diversion of the flow stream around the burner 20. The valving arrangement is such that either a portion or the entire flow may be diverted around the burner 20. After the oxygen content has decreased to the desired level there is no need for continued use of the burner, and therefore, the burner may be removed from the circuit and utilized elsewhere. Where a plurality of storage units and cycles are employed, maximum use may be made of the burner since its use in each of the cycles will be needed for only a relatively short period.

The sequential arrangement of the apparatus as described above eliminates the need for an additional refrigeration unit between the burner 20 and the purification means 18 since the gaseous mixture, prior to entering the purification means 18, passes through the storage chamber 10 which, by necessity, includes a refrigeration unit 12. This invention also permits complete accessibility to the storage chamber 10 since any increase in the oxygen level, such as that caused by one entering the chamber to either inspect, remove or add stored matter, may be removed in a short period of time.

Because the capacity of purification means and burners usually far exceed the requirements of a single storage cycle these units may be employed by a plurality of operating cycles such as illustrated in FIGURE 1 by the solid and dashed lines where there is shown two storage chambers 10, 10' utilizing a common purifying means 18 and combustion means 20, and two humidifiers 30, 30'.

It, therefore, is obvious that through this invention maximum utilization of the several individual operating units has been made and, in so doing, an efficient and inexpensive cycle is provided for the preservation of animal and plant matter. Furthermore, by using a closed cycle, continuously circulating system, the required capacity of the equipment is substantially reduced relative to current systems and the time required to attain the desired atmosphere is also reduced.

What is claimed as new is:

1. A process for preserving animal and plant matter by retarding the respiration rate of said matter contained within a refrigerated storage chamber, the retardation being effected by controlling the content of oxygen and respiration products in the storage atmosphere as it is continuously circulated through a substantially closed circuit including said chamber, said process comprising the sequential steps of:

(a) removing a portion of said storage atmosphere from said chamber, (b) purifying said atmosphere portion by removing carbon dioxide and other respiration products of said matter from said portion to provide a purified portion consisting essentially of nitrogen and oxygen, (c) oxidizing a less-than-stoichiometric quantity of oxygen-combustible fuel in the presence of said purified atmosphere portion to reduce the oxygen content thereof and resulting in a gaseous mixture including nitrogen, oxygen and water vapor, and (d) causing said resultant gaseous mixture to flow into said chamber to ultimately provide a storage atmosphere having a predetermined oxygen content lower than that normally found in atmospheric air, said oxygen content being determined by the specific type of matter being preserved in said storage chamber.

2. The process as defined in claim 1 wherein, after said predetermined oxygen content is provided in said storage atmosphere, steps (a) and (b) are repeated, step (c) is terminated, and the purified atmosphere portion is recirculated into said chamber without further reducing the oxygen content thereof.

3. The process as defined in claim 1 wherein said predetermined oxygen content is up to approximately 5% by volume.

4. The process as defined in claim 1 wherein said oxygen-combustible fuel is selected from the group consisting of hydrogen, alkanes of up to 5 carbon atoms and mixtures thereof.

5. A process for preserving animal and plant matter by retarding the respiration rate of said matter, the retardation being effected by controlling the content of the oxygen and respiration products in the storage atmosphere as it is continuously circulated through a substantially closed circuit, said process comprising the sequential steps of:

(a) storing said matter in a refrigerated storage chamber included in said closed circuit, (b) continuously removing a portion of said storage atmosphere from said chamber, (c) purifying said atmosphere portion by removing carbon dioxide and other respiration products of said matter from said portion to provide a purified portion consisting essentially of nitrogen and oxygen, (d) oxidizing a less-than-stoichiometric quantity of oxygen-combustible fuel in the presence of the purified atmosphere portion to reduce the oxygen content thereof and resulting in a gaseous mixture including nitrogen, oxygen, carbon dioxide and water vapor, (e) humidifying said gaseous mixture, and (f) causing said gaseous mixture to flow into said chamber to thereby gradually reduce the oxygen content of said storage atmosphere and ultimately provide a predetermined oxygen content up to approximately 5% by volume.

6. The process as defined in claim 5 wherein, after said predetermined oxygen content is provided in said storage atmosphere, steps (a) through (c) are repeated, and said purified atmosphere portion is humidified and caused to flow back into said chamber without further reducing the oxygen content thereof.

7. Apparatus for retarding the respiration rate of and preserving animal and plant matter, said apparatus, intended for use with a normally closed, refrigerated storage chamber having said matter therein, and comprising:

(a) purification means for removing carbon dioxide and other respiration products of said matter from the storage atmosphere in which said matter is maintained to provide a purified atmosphere consisting essentially of nitrogen and oxygen, said purification means being adapted to be connected in fluid-receiving relationship with said storage chamber, (b) oxidation means adapted to be connected to said purification means for providing a less-than-stoichiometric quantity of oxygen-combustible fuel to effect substantially complete combustion of said fuel in the presence of said purified atmosphere to thereby reduce the oxygen content of said purified atmosphere and provide a gaseous mixture including nitrogen, oxygen and water vapor, (c) humidification means adapted to be connected to said oxidation means, and (d) closed circuit circulating means for causing said storage atmosphere to sequentially flow from said storage chamber to said purification means, said combustion means, said humidification means and said shortage chamber to ultimately provide a storage atmosphere having a predetermined oxygen content lower than that normally found in atmospheric air, said oxygen content being determined by the specific type of matter being preserved in said storage chamber.

8. The apparatus as defined in claim 7 including valve and conduit means for diverting the flow of said purified atmosphere around said oxidation means and to said humidification means when said predetermined oxygen content is provided in said storage atmosphere.

References Cited by the Examiner

UNITED STATES PATENTS

| | | | |
|---|---|---|---|
| 2,789,059 | 4/1957 | Lindewald | 99—189 |
| 2,923,629 | 2/1960 | Bonomi | 99—154 X |
| 2,955,940 | 10/1960 | Williams | 99—154 |
| 3,102,777 | 9/1963 | Bedrosian et al. | 99—154 X |
| 3,102,780 | 9/1963 | Bedrosian et al. | 99—154 X |
| 3,107,171 | 10/1963 | Robinson | 99—154 |

FOREIGN PATENTS 457,888  12/1936  Great Britain.

A. LOUIS MONACELL, *Primary Examiner.*

HYMAN LORD, *Examiner.*